Dec. 19, 1967 R. S. HIATT, JR 3,359,367

SYNCHRONIZING GENERATOR

Filed March 26, 1964 5 Sheets-Sheet 1

INVENTOR.
RICHARD S. HIATT, JR.
BY Lyon & Lyon
ATTORNEYS

SYNCHRONIZING GENERATOR

Filed March 26, 1964 5 Sheets-Sheet 2

INVENTOR.
RICHARD S. HIATT, JR.
BY Lyon & Lyon
ATTORNEYS

INVENTOR
RICHARD S. HIATT, JR.
BY Lyon & Lyon
ATTORNEYS

INVENTOR
RICHARD S. HIATT, JR.
BY Lyon & Lyon
ATTORNEYS

INVENTOR.
RICHARD S. HIATT, JR.
BY Lyon & Lyon
ATTORNEYS 3,359,367
SYNCHRONIZING GENERATOR Richard S. Hiatt, Jr., San Diego, Calif., assignor to Cohu Electronics, Inc., San Diego, Calif., a corporation of Delaware Filed Mar. 26, 1964, Ser. No. 354,842
28 Claims. (Cl. 178—69.5)

This invention relates to television systems and more particularly relates to a synchronizing generator for use therein.

In television systems, a sensing element having a small area is scanned over the image to be transmitted. The sensing element generates an electrical signal which is proportional to the brightness of the image at the position of the sensing element. This brightness signal is transmitted to the receiver where a small luminous spot is moved across the screen of a picture tube in a path corresponding to that taken by the sensing element. The brightness of the luminous spot, or the intensity of the electron beam, is controlled by the brightness signal and thus the original image is reproduced on the screen. The scanning is normally done by moving the sensing element (and the luminous spot) almost horizontally from left to right with a uniform speed along a straight line. When the bottom line has been scanned, the sensing element returns quickly to the upper left-hand corner and the entire process is repeated.

In order for a picture to be accurately reproduced, the television system must be provided with a pulse generator the purpose of which is to produce horizontal drive pulses to cause the beam to be scanned horizontally and vertical drive pulses to cause the beam to be returned to the upper part of the picture after the bottom line has been scanned. A number of other signals must also be produced to achieve accurate reproduction. First, a synchronizing signal having a horizontal synchronizing component and a vertical synchronizing component must be produced to insure that the scanning element at the receiver is precisely synchronous with the scanning element at the transmitter. Second, a blanking signal, also having horizontal and vertical parts, must be produced, the horizontal part being used to turn off the signal for an interval somewhat longer than the horizontal fly-back time and the vertical part being used to turn the signal off for an interval of somewhat longer than the vertical return or retrace time. These various signals are mixed together and transmitted as a single composite signal, the various parts being again separated at the receiver.

In a standard television system, as prescribed by the Federal Communications Commission, the scanning takes place at the rate of 525 lines per frame and the frame repetition at a rate of 30 frames per second, a frame being a complete scanning of the picture area. In order to reduce flicker, a method known as interlaced scanning is used, and consists of scanning alternate lines (i.e., 1, 3, 5, 7, etc.) and then going back and scanning the remaining lines (i.e., 2, 4, 6, 8, etc.). The scanning of a frame is thus divided into two parts, each part being referred to as a field. Thus, in the standard system, the field rate is 60 fields per second, and it is at this rate that vertical synchronizing signals occur, while the horizontal synchronizing pulses occur at a rate of 15,750 per second to initiate the horizontal lines. The time period necessary to trace a single horizontal line is generally designated by the symbol H.

In a standard system, the vertical signal consists of a train of six pulses, each train having a duration equal to the time required for the tracing of three horizontal lines (3H). These vertical synchronizing pulses have a much greater duration than the horizontal synchronizing pulses so that an integrator which controls the triggering of the beam from bottom to top will respond to the vertical pulses but not to the horizontal pulses. In order that the capacitor of the integrator will always respond in the same manner, a train of equalizing pulses of short duration is generated before and after the vertical synchronizing signal. Normally, each train of equalizing pulses comprises six pulses and has a total duration equal to the time necessary to trace three horizontal lines (3H). Thus, the complete vertical synchronizing signal having both vertical synchronizing pulses and equalizing pulses has a duration equal to the time necessary to trace nine horizontal lines (9H).

The purpose of a synchronizing pulses generator or synchronizing generator is to generate all of these various pulses (horizontal drive pulses, vertical drive pulses, horizontal and vertical blanking pulses, horizontal synchronizing pulses, vertical synchronizing pulses, and equalizing pulses) and to properly relate them so that an accurate picture reproduction is achieved.

A large number of systems for fulfilling this purpose have been proposed. Generally, these systems utilize one or more monostable multivibrators to produce the various pulses, the time constants of the monostable multivibrators being suitably arranged so that the output pulses are of the proper duration and frequency. Generally, a separate monostable multivibrator is provided for producing the vertical drive pulses, the horizontal drive pulses, and a mixed blanking signal. Separate monostable multivibrators are also used to produce the various synchronizing signal components in some systems; in others, a single monostable multivibrator is used for this purpose, the time constant circuit of the monostable multivibrator being externally controlled to cause it to produce output pulses of differing durations and frequencies. These systems are generally provided with a binary counter or frequency divider chain for producing a number of control signals at different frequencies or initiating the triggering of each of the multivibrators.

The use of monostable multivibrators in producing the various pulses creates various problems in maintaining pulse stability and purity. Thus, "trigger jitter" can deleteriously affect the proper timing of the synchronizing pulses, and the width of pulses such as the vertical blanking pulse and the vertical drive pulse are subject to change with temperature, time, and the like. It is therefore an object of the present invention to provide a synchronizing generator for producing these various pulses without using monostable multivibrators.

It is also an object of the present invention to provide such a synchronizing generator in which all of the component pulses of the synchronizing signal are produced by the use of a single pulse shaping circuit.

It is another object of the present invention to provide such a synchronizing generator in which the composite synchronizing signal is produced by a single differentiating and clipping circuit, the charge-discharge time of the differentiating circuit being controlled to provide output pulses of various durations.

It is a further object of the present invention to provide a synchronizing generator in which the vertical blanking pulses and the vertical drive pulses are produced by bistable multivibrators and their pulse width positively determined.

It is a still further object of the present invention to provide such a synchronizing generator in which the vertical blanking bistable multivibrator and the vertical drive bistable multivibrator are directly controlled by a binary counter or frequency divider which also controls the timing of the synchronizing pulses.

The foregoing objects are realized according to the present invention by the use of a pulse differentiating and clipping circuit, hereinafter referred to as a pulse narrower circuit, for producing pulses of the required durations to serve as horizontal synchronizing pulses, vertical synchronizing pulses and equalizing pulses. A second such circuit is used to produce horizontal drive pulses and a third such circuit is used to introduce a delay into the synchronizing signal so that the various synchronizing pulses lag behind the corresponding drive and blanking pulses. Each of these circuits is provided with a variable resistor in the differentiating circuit so that the output pulse duration can be set at any desired value.

The first pulse narrower circuit is further provided with an additional resistance which may be periodically switched into the differentiating circuit to affect its time constant. This pulse narrower circuit receives two different type pulses from the time delay pulse narrower circuit. The first type pulses occur at a frequency of 15.75 kc. and are passed through an attenuating means so that they are of comparatively small amplitude; the second type pulses occur at a frequency of 31.5 kc. and are unattenuated so that they are of comparatively large amplitude. These pulses are periodically gated into the pulse narrower circuit and charge the capacitor of the differentiating circuit to different levels so that output pulses of different durations are produced in response to them, the first type pulses resulting in the production of horizontal synchronizing pulses and the second type in the production of vertical synchronizing pulses. The switching of the additional resistance into the differentiating circuit is controlled by the synchronzing equalizing-interval or synchronizing equalizing gate pulse and serves to modify the first and last third of the second type pulses so that equalizing pulses are produced.

The synchronizing equalizing gate pulse is produced in response to the coincidence of the outputs of various stages of a binary counter or frequency divider and acts to trigger two bistable multivibrators, one of which serves to produce vertical blanking pulses and the other vertical drive pulses. These two bistable multivibrators are turned off by selected outputs of the binary counter so that the duration of their output pulses is accurately and positively controlled. A single multivibrator or divide by two counter is triggered by the 31.5 kc. master oscillator and produces output pulses that are used as horizontal blanking pulses and, when modified by a pulse narrower circuit, as horizontal drive pulses.

The details of these features and the objects and advantages of the present invention will become more apparent upon reference to the accompanying description and drawings in which.

Figure 1:
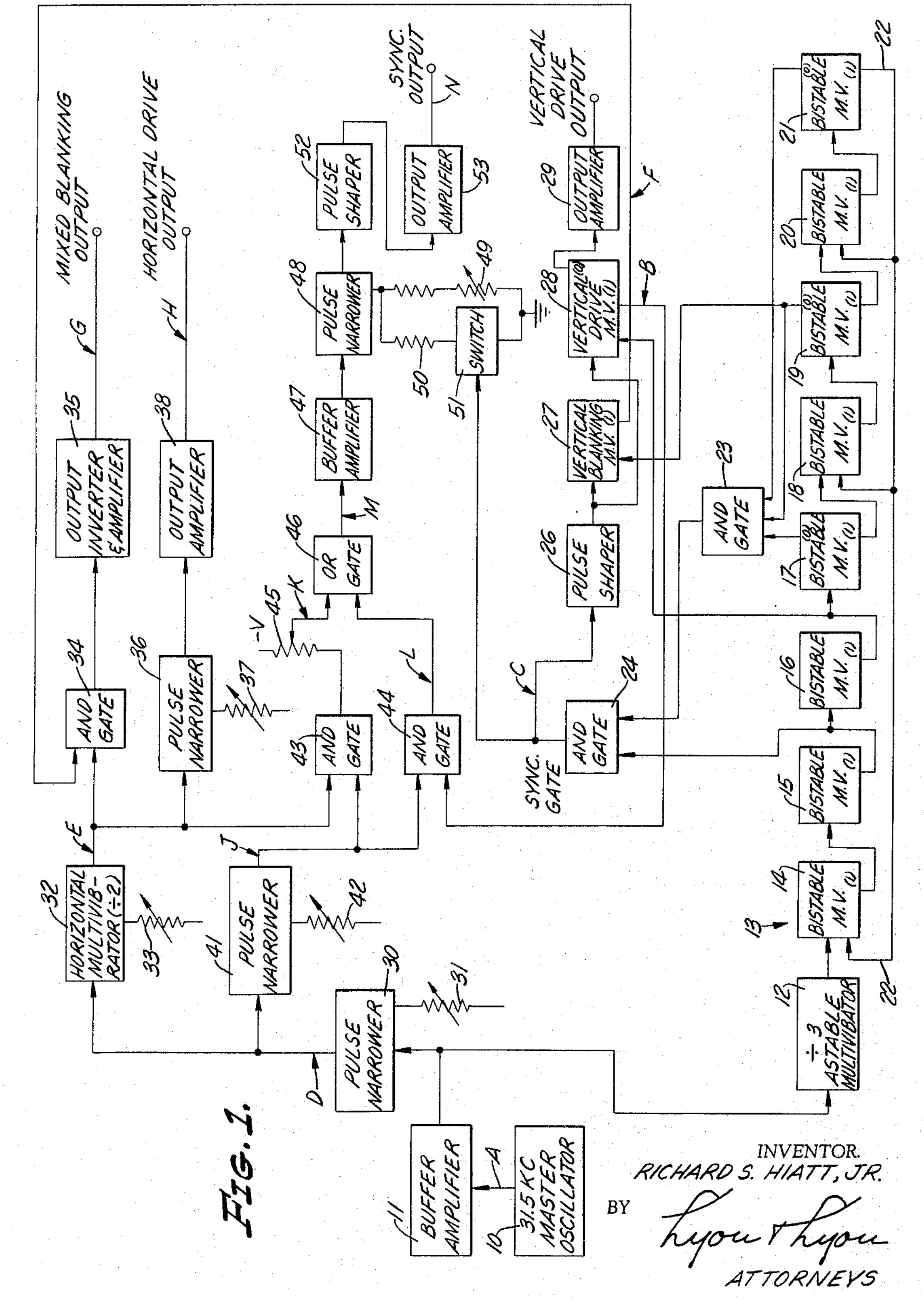
FIGURE 1 is a schematic block diagram of the synchronizing generator of the present invention.

Turning now to FIGURE 1, the overall layout of the synchronizing generator of the present invention is shown in block diagram form. The output of a 31.5 kc. master oscillator 10 is fed through a buffer amplifier 11 to a ÷3 astable multivibrator 12 which produces output pulses at the rate of 10.5 kc. The output of the astable multivibrator 12 is fed to a binary counter or frequency divider 13 which comprises eight conventional bistable multivibrators 14–21 which serve to produce output pulses at various submultiples of the input frequency. The output of the final stage 21 is fed back over a feedback path 22 to the inputs of multivibrators 14, 18 and 20 so that the counter acts as a divide by 175 frequency divider and the output frequency of the final stage 21 is 60 cycles per second.

In describing and claiming the present invention, the following terminology will be used. A positive pulse is one whose leading edge is positive going, even though the pulse itself may still have a negative value; a negative pulse is one whose leading edge is negative going. These terms are thus related only to a hypothetical base line and not an actual electrical base line such as ground potential. Each bistable multivibrator is considered to have a one (1) output and a zero (0) output; the output of the multivibrator is therefore considered to be one if the one output is producing a positive pulse and zero if the zero output is producing a positive pulse.

The zero outputs of the bistable multivibrators 17, 19 and 21 are each connected to an input of an AND gate or coincidence circuit 23. The output of the AND gate 23 is fed to one of the inputs of a further AND gate 24, the other input of which is connected to the one output of the bistable multivibrator 15. The output of the AND gate 24 serves as the synchronizing equalizing gate signal and controls the production of equalizing pulses in the composite synchronizing signal in a manner to be described more fully hereinafter. The output of the AND gate 24 is also fed to a pulse shaper 26, the output of which is applied to the input of a vertical blanking bistable multivibrator 27 which is similar in construction to the bistable multivibrators 14–21. The production of a positive output pulse by the pulse shaper 26 causes the one output of the vertical blanking multivibrator 27 to produce a positive output pulse, this output pulse being terminated upon the occurrence of a positive pulse from the zero output of the bistable multivibrator 19.

The output of the pulse shaper 26 is also fed to the input of a vertical drive bistable multivibrator 28 which is similar in construction to the vertical blanking multivibrator 27. A positive output pulse from the pulse shaper 26 causes the vertical drive multivibrator to produce a positive output pulse from its one output. The multivibrator 28 is switched to produce a positive output pulse from its zero output upon the occurrence of a positive pulse from the one output of bistable multivibrator 16. The zero output of the vertical drive multivibrator 28 is passed through output amplifier 29 and serves as the vertical drive output signal.

The output of the 31.5 kc. master oscillator 10 is also fed through buffer amplifier 11 to a pulse narrower circuit 30 having a pulse width control 31 and thence to a horizontal multivibrator or divide by 2 counter 32 having a pulse width adjustment resistor 33 which permits the width of the output pulse to be adjusted to equal the desired width of the horizontal blanking pulse. The output of the horizontal multivibrator 32 (waveform E of FIGURE 6) is coupled to one input of an AND gate 34, the other input of which is connected to the one output of the vertical blanking multivibrator 29. AND gate 34 serves as a negative coincidence circuit and produces a negative output signal only when both inputs are negative. This output signal is fed to the output amplifier 35, the output of which is the mixed blanking output signal, shown at G in FIGURE 6.

The output of the horizontal multivibrator 32 is also applied to a pulse narrower circuit 36 similar to circuit 30 and having a pulse width control 37. The details of this pulse narrower circuit will be discussed in connection with FIGURE 2. The output of this circuit is passed through output amplifier 38 and provides the horizontal drive signal, shown at H in FIGURE 6.

The output of the pulse narrower circuit 30 is also applied to the input of a further pulse narrower circuit 41 having a pulse width control 42. The circuit 41 is similar to circuits 30 and 36. The output of the pulse narrower circuit 41 is connected to one input of an AND gate 43, the other input of which is connected to the output of the horizontal multivibrator 32. The output of the pulse narrower 41 is also connected to a second AND gate 44, the other output of which is connected to the one output of vertical drive multivibrator 28. The output of AND gate 43 is connected through an amplitude control potentiometer 45 to an input of an OR gate 46. The output of the AND gate 44 is also connected to an input of the OR gate 46. The OR gate 46 thus serves as a mixing circuit to combine the outputs of the two AND gates 43 and 44.

The output of OR gate 46 is passed through a buffer amplifier 47 to a pulse narrower circuit 48. As was the case with the pulse narrower circuits 30, 36 and 41, the circuit 48 has a pulse width control 49. Connected in parallel to the control 49 are a resistor 50 and a switch 41. The switch 51 is arranged to be closed upon the occurrence of an output signal from the AND gate 24, that is, upon the occurrence of the synchronizing equalizing gate pulse. The parallel connection of the resistor 50 with the pulse width control 49 causes the pulse narrower circuit 48 to produce a pulse of lesser width than would be the case if the switch 51 was open, as will be explained in detail in connection with FIGURE 2. The output of the pulse narrower 48 is passed through a pulse shaper 52 and output amplifier 53 and provides a composite synchronizing signal having horizontal synchronizing pulses, vertical synchronizing pulses, and equalizing pulses.

The circuit of FIGURE 1 produces a composite synchronizing signal in the following manner. The pulse width control 31 of the pulse narrower circuit 30 is adjusted to provide a delay necessary to compensate for the inherent delay of binary counters. The circuit 30 is thus arranged to provide a pulse having a leading edge occurrence coincident with the ÷3 multivibrator trigger and a trailing edge coincident with the synchronizing control signal leading edge, as shown at D in FIGURE 6. The output of circuit 30 is fed to the pulse narrower circuit 41 whose pulse width control 42 is adjusted so that the output pulses have a duration or pulse width of 1.2 microseconds at a frequency of 31.5 kc. as shown at J of FIGURE 6. This pulse train is passed to the AND gate 43. Since the other input of the AND gate 43 is connected to the horizontal multivibrator 32, each alternate pulse is taken out and the output of the AND gate 43 is a train of 1.2-microsecond duration pulses at a frequency of 15.75 kc. These pulses are passed through amplitude control potentiometer 45 which attenuates them, the resultant waveform being shown as K in FIGURE 6. These pulses are then passed through OR gate 46 and buffer amplifier 47 to the pulse narrower circuit 48.

The pulse narrower circuit 48 includes a differentiator circuit, a resistive component of which is the pulse width control 49. By adjusting this control, the duration of the output pulses can be set at any desired value. The duration of the output pulses is also, of course, dependent on the height of the input pulses and thus the attenuated 1.2-microsecond pulses will produce a train of output pulses of a first duration and a frequency of 15.75 kc. These pulses are passed through and inverted by pulse shaper 52 and output amplifier 53 and serve as the horizontal synchronizing pulses.

The output pulse train from the pulse narrower circuit 41 is also applied to one input of the AND gate 44. The other input of AND gate 44 is connected to the one output of the vertical drive multivibrator 28, and thus this gate will pass the input pulses only during the occurrence of a positive pulse at this output. When such a pulse occurs, the AND gate 44 passes a train of pulses (shown as waveform L of FIGURE 6) at a frequency of 31.5 kc. through OR gate 46 and buffer amplifier 47 to the pulse narrower 48. The OR gate 46 thus has an output as shown at M in FIGURE 6. Since these latter pulses do not pass through a height control potentiometer as do the 15.75 kc. pulses, they put a greater charge on the capacitor of the differentiator circuit; as a result, the pulse narrower circuit 48 produces a considerably wider pulse in response to them. These wider pulses are also passed through and inverted by pulse shaper 52 and output amplifier 53 and serve as the vertical synchronizing signals.

At the time that the pulse from the vertical drive multivibrator 28 appears at the input of the gate 44, the synchronizing equalizing gate pulse is applied to the switch 51. As is conventional, this synchronizing equalizing gate pulse is on for a duration of 3H, off for an interval of 3H and then on again for a duration of 3H. When this pulse is on (negative in the present case), it closes switch 51 and changes the resistance in the differentiating circuit of the pulse narrower circuit 48. This changes the charge-discharge timing of the circuit such that pulses of very short duration are produced by the pulse narrower circuit 48 in response to one of the input 31.5 kc. pulses.

The short duration pulses are passed through and inverted by pulse shaper 52 and output amplifier 53 and serve as the equalizing pulses in the composite synchronizing signal. The resulting composite synchronizing signal is shown at N in FIGURE 6.

By making the pulse narrower circuit 48 responsive to the trailing edge of the output pulses of the pulse narrower circuit 41, a 1.2-microsecond delay is introduced between the synchronizing pulses and the original 31.5 kc. pulses from the pulse narrower 30. The necessity of providing a delay line or other similar delay circuit to introduce a time lag between the synchronizing pulses and the corresponding drive and blanking pulses is thereby avoided.

Figure 2:
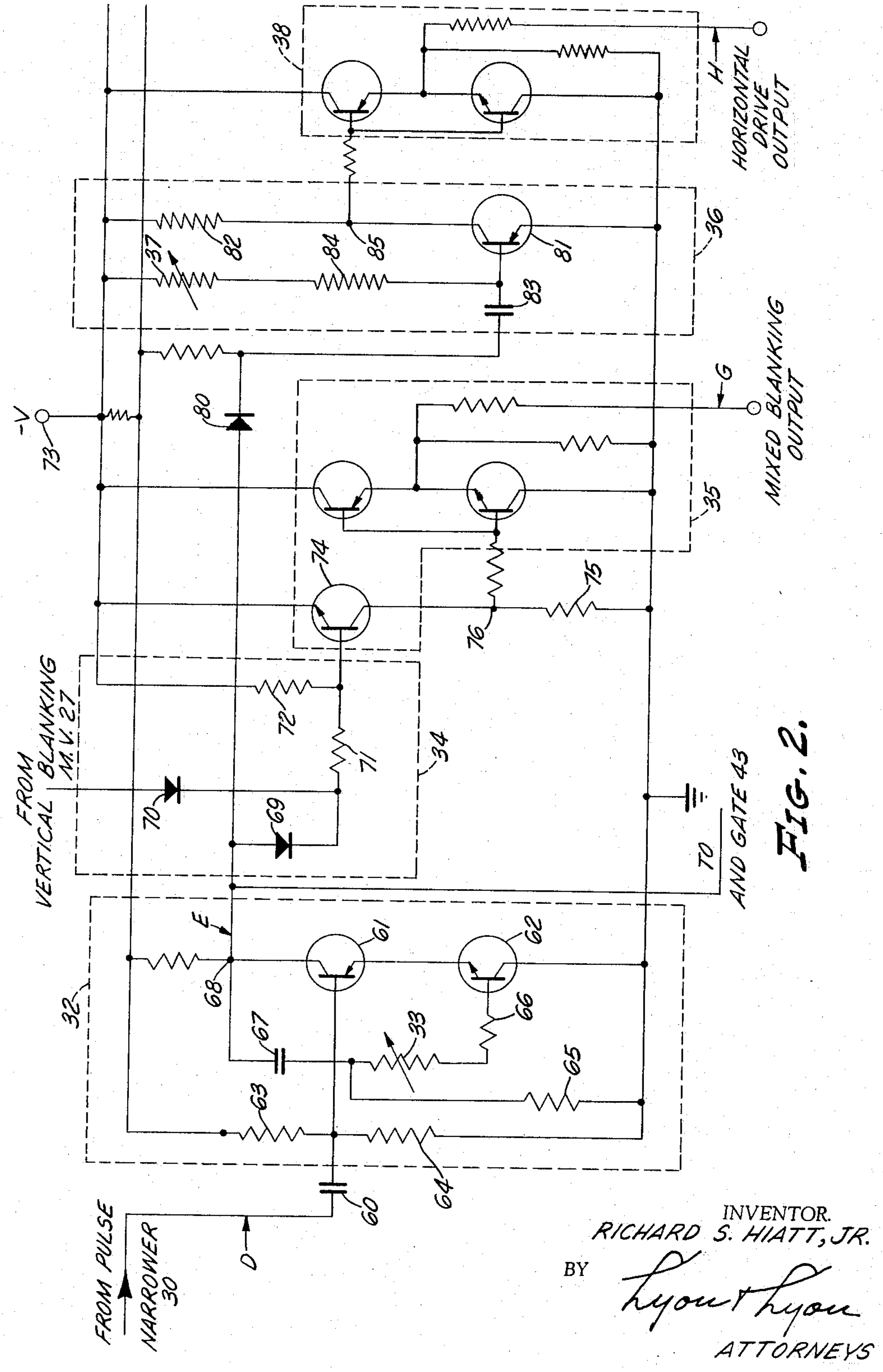
FIGURE 2 is a schematic diagram of the circuitry used to produce the horizontal drive output and the mixed blanking output of the synchronizing generator.

Turning now to FIGURE 2, the details of the circuitry utilized to produce the mixed blanking output signal and the horizontal drive output signal are illustrated. As can be seen, the pulses from the pulse narrower 30 are fed through a coupling capacitor to the base of a PNP transistor 61. This transistor is connected in series with an NPN transistor 62 between ground and a negative potential. The transistor 61 is normally biased to conduct by a voltage divider comprising resistors 63 and 64, the junction of which is connected to the base of transistor 61 and to the capacitor 60. The transistor 62 is also normally biased to conduct by resistors 65 and 66, and variable resistor 33, which serves as a pulse width adjustment control. A capacitor 67 is connected between the junction of resistors 65 and 33 and output terminal 68 of transistor 61.

In explaining the operation of this part of the circuit, let it be assumed that a positive pulse has just been produced by pulse narrower circuit 30. At the end of this pulse, the negative going portion raises the potential at the base of the transistor 61 and it begins to conduct reducing the voltage at the emitter of transistor 62 causing it to conduct. A positive output pulse thus appears at output terminal 68. The positive pulse at terminal 68 causes the capacitor 67 to be discharged at a rate determined by the value of the resistor 66. At a certain point, determined by the value of the resistor 33, the capacitor 67 will become discharged sufficiently to bias the transistor 62 to the non-conducting state. The pulse appearing at terminal 68 is thus terminated.

The occurrence of a further pulse from the pulse narrower circuit 30 will not be able to cause the multivibrator 32 to produce another output pulse until the capacitor 67 has charged sufficiently through resistor 65 to bias the transistor 62 in the conductive state. Thus, the RC time constant of the capacitor 67 and resistors 65 and 66 can be adjusted so that an output pulse is produced only on the occurrence of every other input pulse. The adjustable resistor 33 is used to set the width of the output pulse appearing at terminal 68 and, as previously mentioned, this pulse width is preferably set at the desired width of a horizontal blanking pulse.

The output of the multivibrator or divide by 2 counter 32 is fed to a diode 69 and provides one input to the AND gate 34. The other input of the AND gate 34 is from the one output of the vertical blanking multivibrator 27 and is passed through a second diode 70. The junction of the diode 69 and 70 is connected by resistors 71 and 72 to a point of negative potential 73. It can thus be seen that when a positive pulse is passed through either the diode 69 or the diode 70, a voltage drop is present across the resistors 71 and 72 and the junction point between them is at a potential higher than that of the point of negative potential 73. When, however, neither the multivibrator 32 nor the vertical blanking multivibrator 27 produces a positive output pulse, the junction point between the resistors 71 and 72 is at essentially the same potential as the point 73. The diodes 69 and 70 and resistors 71 and 72 thus act as a coincidence gate, a negative signal appearing at the output thereof only when the two inputs are negative.

The junction point between the resistors 71 and 72 is connected to the base of an NPN transistor 74, the emitter of which is connected to the point 73 and the collector of which is connected through a resistor 75 to ground. The transistor 74 is normally biased into the non-conducting state. When a potential appears across the resistor 72, however, the transistor 74 conducts and the voltage at output terminal 76 decreases thereby inverting the output of gate 34. The output of the transistor 74 is passed through a conventional complementary emitter follower stage and appears at the mixed blanking output terminal.

The output of the horizontal multivibrator 32 is also applied to the input of a pulse narrower circuit 36 through a diode 80. This pulse narrower circuit 36 is functionally equivalent to what is known as a "box car" circuit in the vacuum tube art. As illustrated, it comprises a transistor 81 of PNP type having its emitter connected to ground and its collector connected through a resistor 82 to the point of negative potential 73. The input to the base of the transistor 81 is passed through a differentiating circuit comprising a capacitor 83, a resistor 84 and the pulse width control variable resistor 37.

The transistor 81 is normally conducting and is turned off in response to the leading edge of a positive pulse applied to its base. When the transistor 81 stops conducting, a negative pulse appears at the output terminal 85. The duration of this negative pulse is dependent upon the RC time constant of the differentiating circuit 83, 84, 37. By adjusting the value of the resistor 37, the negative output pulse can thus be adjusted to have any desired pulse duration. The output appearing at the terminal 85 is passed through the output amplifier 38 which comprises a conventional complementary emitter follower stage and appears as a train of negative pulses at the horizontal drive output terminal.

Figure 3:
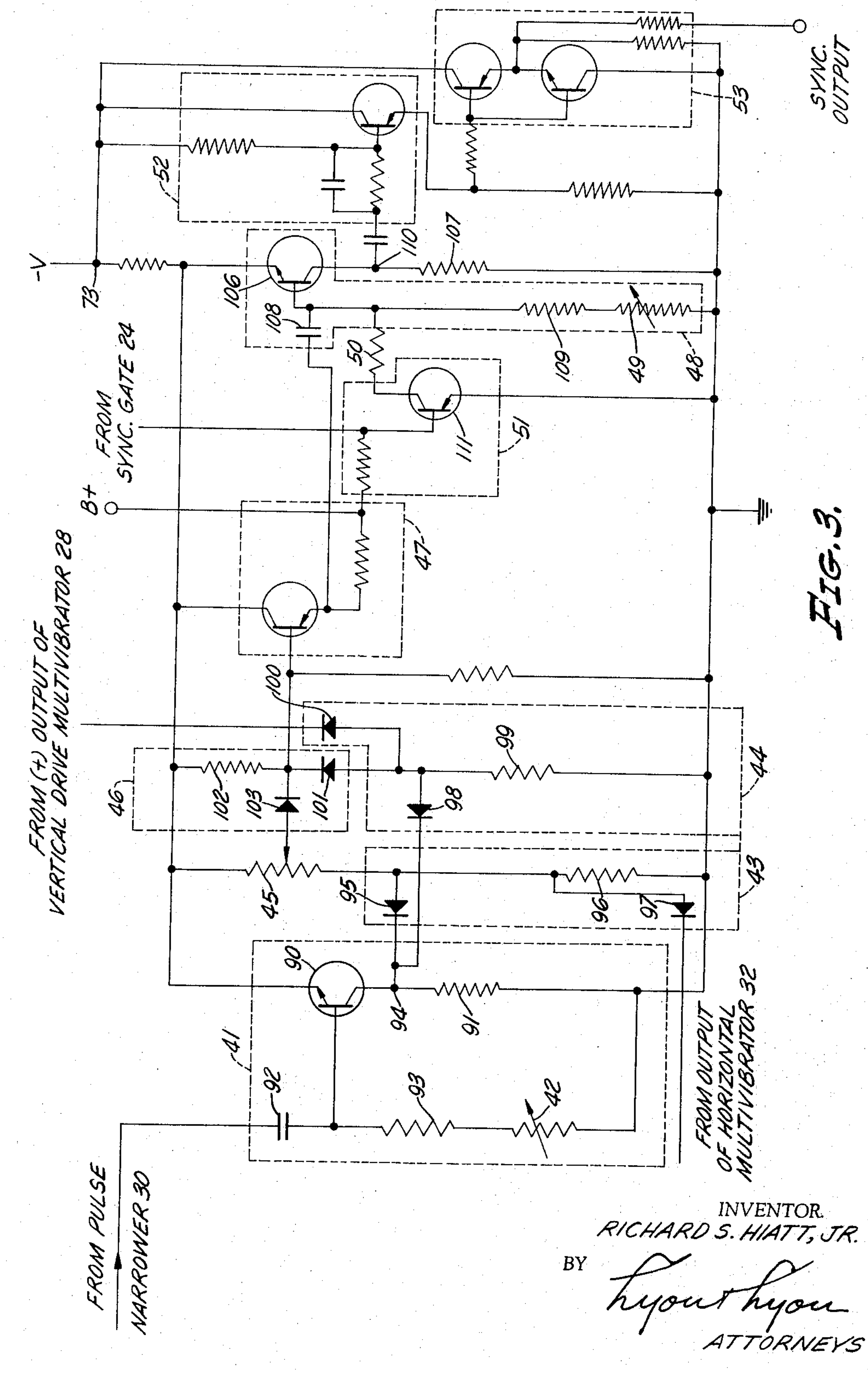
FIGURE 3 is a schematic diagram of the circuitry used to produce the combined synchronizing output of the synchronizing generator.

Turning now to FIGURE 3, the details of the circuitry used to obtain the composite synchronizing signal are illustrated. The output from the pulse narrower circuit 30 is passed to the input of a pulse narrower circuit 41. The pulse narrower circuit 41 includes a transistor 90 of NPN type whose emitter is held at a negative potential and whose collector is connected through a resistor 91 to ground. The base of the transistor 90 is connected to the output of the oscillator 11 through a differentiating circuit which includes a capacitor 92, a resistor 93 and the pulse width control variable resistor 42.

The transistor 90 is biased to normally conduct and thus when the leading edge of a positive pulse appears from circuit 30, the spike produced by the differentiating circuits 92, 93, 42 does not affect the conduction of a transistor 90 and the potential at the output terminal 94 remains at a negative value. However, when the pulse from pulse narrower circuit 30 terminates, the differentiating circuit produces a negative spike which acts to turn off the transistor 90 with the result that the potential at the output terminal 94 rises to produce a positive output pulse. The width of this pulse is determined by the value of the components of the differentiating circuit and can be adjusted by means of the variable resistor 42. As previously stated, this output pulse is preferably provided with a duration of 1.2 microseconds.

A diode 95 has its cathode connected to the output terminal 94 of the pulse narrower circuit 41 and has its anode connected to one end of a resistor 96, the other end of which is connected to ground. A second diode 97 also has its anode connected to the resistor 96 and has its cathode connected to the output of the horizontal multivibrator 32. The diodes 95 and 97 and the resistor 96 form the AND gate 43. When both the pulse narrower circuit 41 and the horizontal multivibrator 32 are simultaneously producing a positive output pulse, a potential drop is established across the height control potentiometer 45 which is connected in series with the resistor 96.

The output terminal 94 of the pulse narrower circuit 41 is also connected to the cathode of a diode 98, the anode of which is connected to one end of a resistor 99 whose other end is connected to ground. A second diode 100 also has its anode connected to the resistor 99 and has its cathode connected to the one output of the vertical drive multivibrator 28. The diodes 98 and 100 and the resistor 99 form the AND gate 44. When both the pulse narrower circuit 41 and the one output of the vertical drive multivibrator produce positive pulses, a potential drop is established across the diode 101 and a resistor 102 which are connected in series with resistor 99.

The diode 101 and resistor 102, together with a diode 103 connected to the wiper arm of the potentiometer 45, form the OR gate or mixing circuit 46. The OR gate 46 will produce an output signal when either of the AND gates 43 or 44 produce an output. As can be seen, the output of the AND gate 43 is attenuated by the potentiometer 45, and therefore the pulses fed to the OR gate 46 through the diode 103 will have lesser amplitude than the pulses fed through the diode 101. The output of the OR gate 46 is passed through a conventional buffer amplifier 47 to the input of a pulse narrower circuit 48 which is similar in construction to the pulse narrower circuit 41.

An NPN transistor 106 has its collector connected to ground through a resistor 107 and has its emitter connected to a point of negative potential. The base of transistor 106 is connected to a differentiating circuit comprising a capacitor 108, a resistor 109, and a pulse width control variable resistor 49. As can be seen, this circuit 48 acts in the same manner as the circuit 41 and produces a positive pulse of any desired duration at the output terminal 110 in response to the trailing edge of a positive input pulse. Since the output pulses from the pulse narrower circuit 41 are 1.2 microseconds in duration, and since the pulse narrower circuit 48 produces an output signal in response to the trailing edge of these pulses, the desired 1.2 microsecond delay between the synchronizing pulses and the blanking and drive pulses is produced.

As was previously stated, the OR gate 46 produces two different type pulses. The first pulses, which come from the AND gate 43, are at a frequency of 15.75 kc. and are of reduced amplitude. The second set of pulses coming from the AND gate 44 are at a frequency of 31.5 kc. and are of full amplitude. The output of the pulse narrower circuit 48 is dependent upon the values of the components of the differentiating circuit; however, it is also dependent upon the amplitude of the input pulses, as this determines the charge placed on the capacitor 108. The pulse narrower circuit 48 therefore will produce output pulses of a first duration in response to output signals from the AND gate 44.

The duration of these signals may be established by means of the pulse width control resistor 49 and may be utilized as the vertical synchronizing pulses. These pulses, of course, occur at a frequency of 31.5 kc. Since the amplitude of the pulses produced by the AND gate 43 is smaller, the duration of the output pulses of the pulse narrower circuit 48 in response to them will be correspondingly shortened and these pulses, occurring at a frequency of 15.75 kc., serve as the horizontal synchronizing pulses.

A resistor 50 and a transistor 111 of PNP type are connected in parallel with the resistor 109 and the pulse width control adjustable resistor 49. The transistor 111 forms the switch 51 and is normally non-conducting so that the resistor 50 has no influence on the time constant of the differentiating circuit. However, when the transistor 111 is switched on, the resistor 50 is connected into the differentiating circuit to reduce its time constant with the result that the output pulses of the pulse narrower circuit 48 have a considerably shorter duration than would otherwise be the case. The transistor 111 is switched on by a negative output pulse from the AND gate 24.

As previously explained, the output of the AND gate 24 coincides with the output of the vertical drive multivibrator 28 and is negative for a 3H interval, positive for a 3H interval and then negative again for a 3H interval. Thus, the resistor 50 will be connected into the differentiating circuit during the occurrence of the first and last third of the pulses produced by the AND gate 44 and will considerably reduce the duration of the pulses produced by the circuit 48 in response to them. These narrow pulses occur at a frequency of 31.5 kc. and are used as the equalizing pulses.

The output terminal 110 of the pulse narrower circuit 48 is connected to the input of a pulse shaper and inverter circuit 52 of conventional design. The output of the circuit 52 is connected through a conventional emitter follower stage 53 to the composite synchronizing signal output terminal. It can thus be seen that a composite synchronizing signal is produced by merely changing the charge-discharge characteristic of a differentiating circuit.

Figure 4:
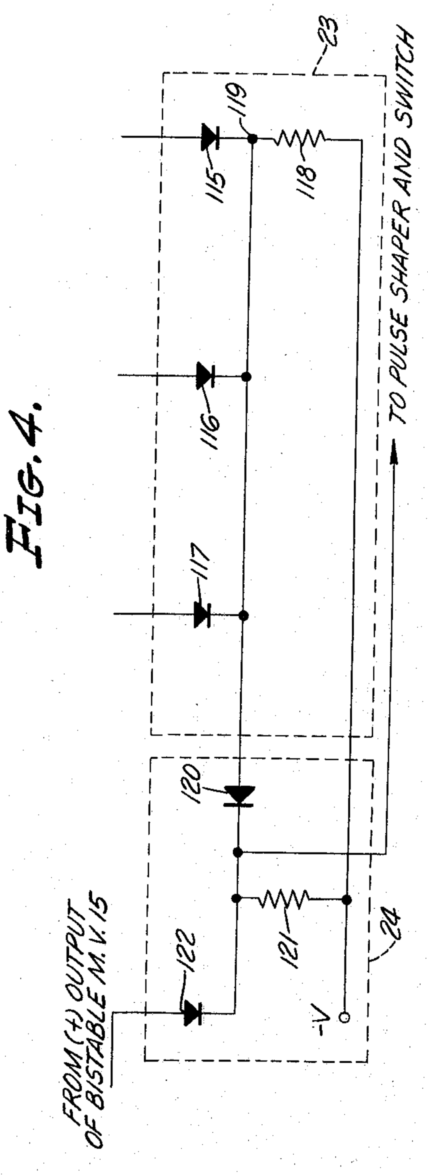
FIGURE 4 is a schematic diagram of a pair of gating circuits used in connection with the binary counter of the synchronizing generator.

Turning now to FIGURE 4, the details of the AND gates 23 and 24 are illustrated. The AND gate 23 comprises diodes 115, 116 and 117, the cathodes of each of these diodes being connected to one end of a resistor 118 at junction 119, the other end of which is connected to a point of negative potential. The anodes of the diodes 115, 116 and 117 are connected to the zero outputs of the bistable multivibrators 21, 19 and 17 respectively. If the zero output of any of these multivibrators produces a positive pulse, a potential is developed across the resistor 118. If none of the negative outputs are energized, the junction 119 is at a negative potential and there is no significant potential drop across the resistor 118.

The junction 119 is connected through a diode 120 to one end of a resistor 121. The other end of the resistor 121 is connected to the point of negative potential. A second diode 122 also has its cathode connected to the one end of the resistor 121 and has its anode connected to the one output of the bistable multivibrator 15. The diodes 120 and 122 and the resistor 121 form the AND gate 24, the output of which appears at the upper end of the resistor 121. The AND gate 24 produces a negative output only when no positive pulse is produced at the one output of bistable multivibrator 15 and the junction 119 of the AND gate 23 is at a negative potential. At all other times, the output of the AND gate 24 is positive.

Figure 5:
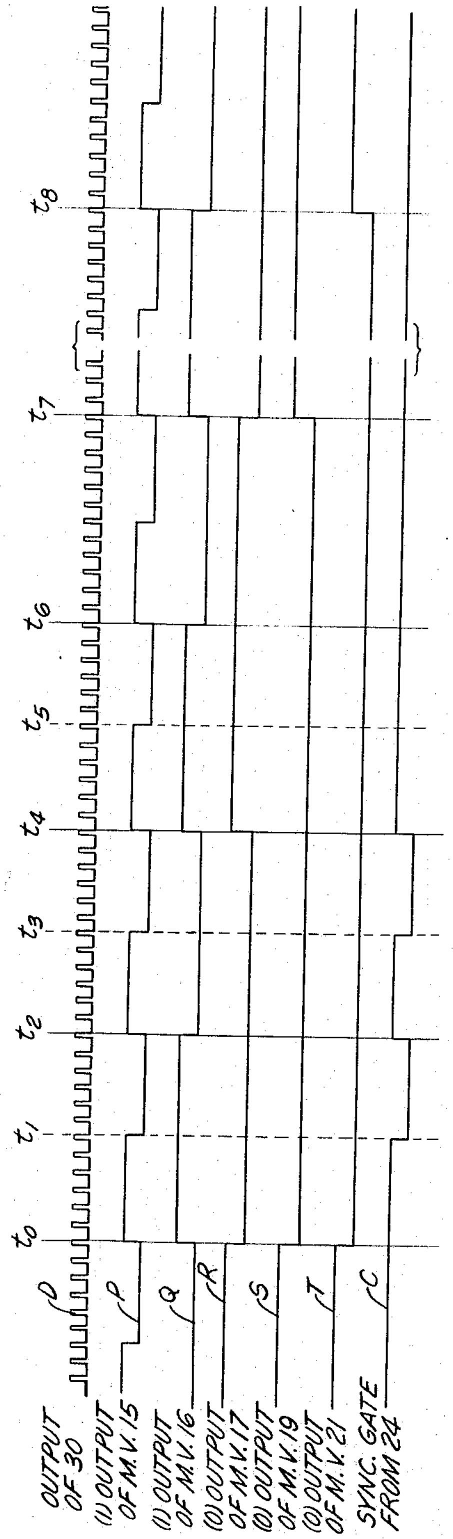
FIGURE 5 illustrates the output waveforms of various stages of the binary counter and its associated gating circuits.

The manner in which the synchronizing equalizing gate pulse is generated can be seen from FIGURE 5. At $t_0$, the zero output R of multivibrator 17 has just gone negative as have the zero outputs S and T of the multivibrators 19 and 21. The output of the gate 23 is therefore negative. However, the one output P of the multivibrator 15 is energized and thus the output of the gate 23 is positive. At time $t_1$, the zero outputs R, S and T of the multivibrators 17, 19 and 21 are still negative, but, at this time, the one output P of the multivibrator 15 also goes negative and thus the gate 24 produces a negative output as shown at C. At time $t_2$, the zero outputs of multivibrators 17, 19 and 21 are still negative; however, the one output of multivibrator 15 has again gone positive and thus the gate 24 once again produces a positive output signal.

At time $t_3$, the one output of the multivibrator 15 is again negative while the zero outputs of the multivibrators 17, 19 and 21 remain negative and therefore the gate 24 again produces a negative output. At time $t_4$, the one output of multivibrator 15 is again positive as is the zero output of the multivibrator 17. The gate 24 therefore produces a positive output. The zero output of multivibrator 17 remains positive from $t_4$ to $t_7$ and therefore changes in the output of the multivibrator 15 are ineffective to change the output of the gate 24.

At time $t_7$, the zero output of the multivibrator 17 goes negative, but at this time the zero output of the multivibrator 19 goes positive, and thus the AND gate 24 continues to produce a positive output. At time $t_8$, the zero output of the multivibrator 19 goes negative, however, at this time the zero output of the multivibrator 21 is positive and this multivibrator output remains positive until the entire cycle is completed, that is, until $t_0$ is reached again. The output of the gate 24 is therefore positive continuously except for two intervals of 3H duration each, the negative intervals being separated by a 3H positive interval.

Figure 6:
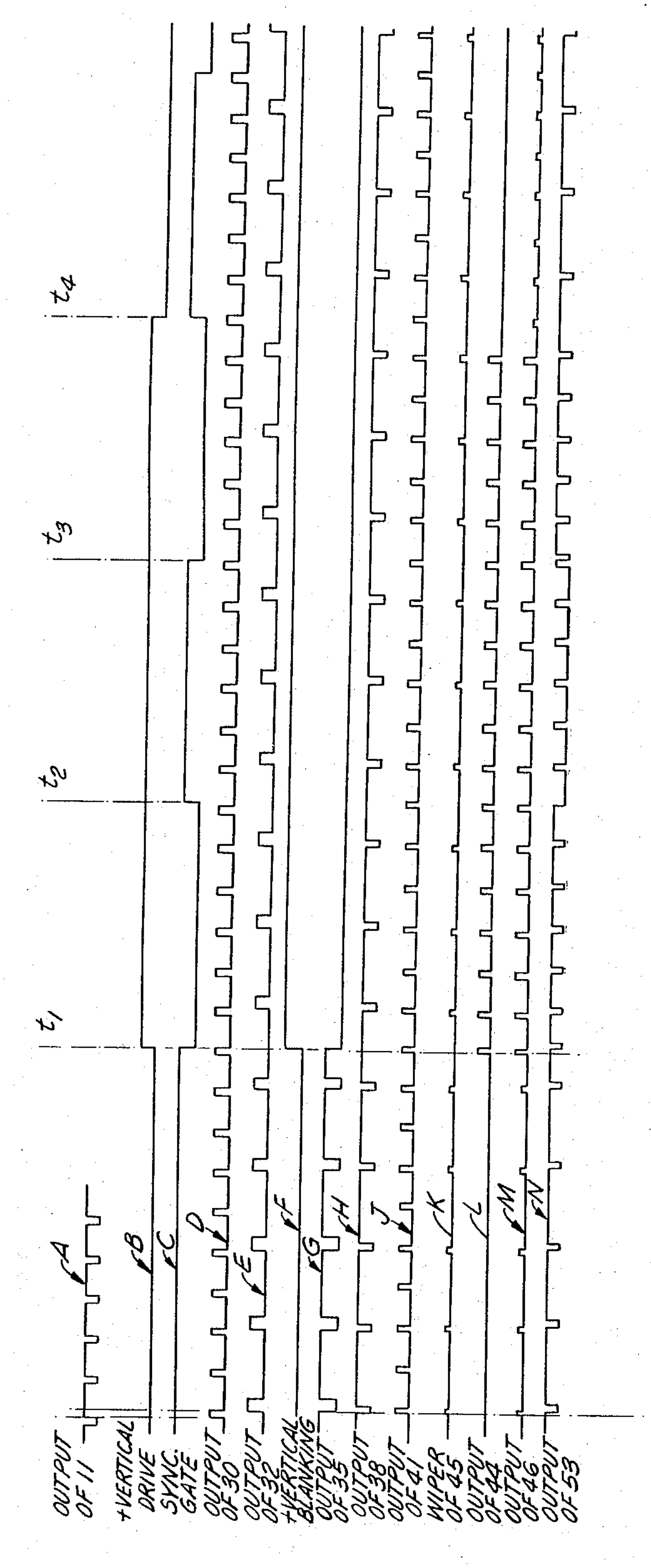
FIGURE 6 illustrates the waveforms present at various points in the circuit.

As can be seen from FIGURES 5 and 6, the vertical blanking and vertical drive bistable multivibrators 27 and 28 are each caused to initiate the production of a positive output pulse at their one outputs when the output of AND gate 24 goes negative. This occurs at $t_1$. The one output of the vertical blanking multivibrator 27 is triggered off by the next occurrence of a positive pulse at the zero output of bistable multivibrator 19 at $t_7$, while the one output of the vertical drive multivibrator 28 is triggered off by the next occurrence of a positive pulse at the one output of bistable multivibrator 16 at $t_4$. The duration of the output pulses of each of these multivibrators is thus positively and accurately controlled.

From the foregoing description it can be seen that a television synchronizing generator has been provided which does not use monostable multivibrators to produce the various necessary output pulses. The synchronizing pulses are produced by a pulse narrower circuit including a differentiator having a variable time constant controlled by the synchronizing gate pulse. Horizontal and vertical synchronizing pulses are produced by this circuit by feeding it pulses of different amplitude and frequency while equalizing pulses are produced by changing the time constant of the differentiator during the occurrence of the high amplitude pulses. The vertical blanking and vertical drive pulses are produced by positively controlled bistable multivibrators while the horizontal drive pulses are produced by a narrower circuit. Pulse narrower circuits are also used to insert the proper delays into the system, and thus eliminate the need for delay lines or delay multivibrators. It should be obvious to those skilled in the art that the various logic circuits utilized could be replaced by their functional equivalents within the scope of the present invention.

The invention may be embodied in other specific forms not departing from the spirit or central characteristics thereof. The present embodiment is therefore to be considered in all respects as illustrative and not restrictive the scope of the invention being indicated by the appended claims rather than by the foregoing description, and all changes which come within the meaning and range of equivalency of the claims are therefore intended to be embraced therein.

I claim:

1. A system for providing a composite television synchronizing signal including horizontal, vertical and equalizing pulses of different durations, comprising:
a source of pulses of a first frequency;
first gate means coupled to said pulse source for passing every other pulse;
means coupled to said first gate means for attenuating the pulses passed thereby;
second gate means coupled to said pulse source and periodically operable to pass all of said pulses;
means including a differentiating circuit for producing output pulses in response to input pulses;
means coupling said attenuating means and said second gate means to said differentiating circuit whereby pulses passed by said first gate means cause the production of output pulses of a first duration, and pulses passed by said second gate means cause the production of output pulses of a second duration; and
means for changing the time constant of said differentiating circuit whereby output pulses of a third duration are produced.

2. A pulse generator for producing pulses of different durations, comprising:
means for producing pulses of a first amplitude;
means for producing pulses of a second amplitude;
means having a differentiating circuit including a capacitor for producing output pulses;
means coupling said first pulse producing means to said differentiating circuit whereby said pulses charge said capacitor to a first value and cause said output pulse producing means to produce output pulses of a first duration, and coupling said second pulse producing means to said differentiating circuit whereby said pulses charge said capacitor to a second value and cause said output pulse producing means to produce output pulses of a second duration; and
means coupled to said differentiating circuit for changing the time constant thereof whereby said output pulse producing means produces output pulses of a third duration.

3. A pulse generator for producing pulses of different durations and frequencies, comprising:
a source of pulses of a first frequency;
first gate means coupled to said pulse source for passing only selected pulses produced thereby;
means coupled to said first gate means for attenuating the pulses passed thereby;
second gate means coupled to said pulse source and periodically operable to pass all of said pulses;
means having a differentiating circuit including a capacitor for producing output pulses in response to input pulses;
means coupling said attenuating means and said second gate means to said differetiating circuit whereby said attenuated pulses charge said capacitor to a first value and cause said output pulse producing means to produce output pulses of a first duration and pulses passed by said second gate means charge said capacitor to a second value and cause said output pulse producing means to produce output pulses of a second duration.

4. The pulse generator of claim 3 wherein means coupled to said differentiating circuit are provided for changing the time constant thereof whereby said output pulse producing means produces output pulses of a third duration.

5. A system for providing a composite television synchronizing signal including horizontal, vertical and equalizing pulses of different durations, comprising:
a source of pulses of a first frequency;
first gate means coupled to said pulse a source for passing every other pulse;
means coupled to said first gate means for attenuating the pulses passed thereby;
second gate means coupled to said pulse source and periodically operable to pass all of said pulses;
means including a differentiating circuit having a capacitor for producing output pulses in response to input pulses;
means coupling said attenuating means to said differentiating circuit whereby said attenuated pulses charge said capacitor to a first value and cause said output pulse producing means to produce output pulses of a first duration, and coupling said second gate means to said differentiating circuit whereby pulses passed thereby charge said capacitor to a second value and cause said output pulse producing means to produce output pulses of a second duration;
means coupled to said differentiating circuit and operable to change the time constant thereof; and
means coupled to said operable means to render said means periodicaly operable when said second gate means is rendered operable.

6. A system for producing a composite television synchronizing signal including horizontal and vertical pulses of different durations, comprising:
a first source of pulses of a first frequency;
a second source of pulses of a second frequency;
a first coincidence circuit having inputs coupled to said first and second sources of pulses for producing an output pulse upon the coincidence of pulses received therefrom;
attenuator means coupled to said first coincidence circuit for attenuating the pulses produced thereby;
a third source of pulses of a third frequency;
a second coincidence circuit having inputs coupled to said first and third sources for producing an output pulse upon coincidence of pulses received therefrom;
means for producing output pulses in response to input pulses, said means including a differentiating circuit having a capacitor and a resistor; and
means coupling said attenuating means and said second coincidence circuit to said differentiating circuit whereby pulses from said attenuating means charge said capacitor to a first value and cause said output pulse producing means to produce horizontal synchronizing pulses of a first duration, and pulses from said second coincidence circuit charge said capacitor to a second value and cause said output pulse producing means to produce vertical synchronizing pulses of a second duration.

7. A system for producing a composite television synchronizing signal including horizontal, vertical and equalizing pulses of different durations, comprising:
a first source of pulses of a first frequency;
a second source of pulses of a second frequency;
a first coincidence circuit having inputs coupled to said first and second sources of pulses for producing an output pulse upon the coincidence of pulses received therefrom;
attenuator means coupled to said first coincidence circuit for attenuating the pulses produced thereby;
a third source of pulses of a third frequency;
a second coincidence circuit having inputs coupled to said first and third sources for producing an output pulse upon the coincidence of pulses received therefrom;
means for producing output pulses in response to input pulses, said means including a differentiating circuit having a capacitor and a resistor;
means coupling said attenuating means and said second coincidence circuit to said differentiating circuit whereby pulses from said attenuating means charge said capacitor to a first value and cause said output pulse producing means to produce horizontal synchronizing pulses of a first duration, and pulses from said second coincidence circuit charge said capacitor to a second value and cause said output pulse producing means to produce vertical synchronizing pulses of a second duration;

resistance means;

means operable to connect said resistance means into said differentiating circuit to change the time constant thereof; and means coupled to said operable means to render said means operable during the first and last thirds of each pulse from said third pulse source and cause said output pulse producing means to produce equalizing pulses of a third duration.

8. A television synchronizing generator, comprising:

a source of pulses of a first frequency;

means coupled to said source of pulses for producing output pulses of a second frequency, said second frequency being one third of said first frequency;

frequency divider means coupled to said pulse producing means for producing pulses at submultiples of said second frequency;

means coupled to said frequency divider means for producing a synchronizing equalizing gate pulse;

a first bistable multivibrator;

means coupling said first bistable multivibrator to said synchronizing equalizing gate pulse producing means and said frequency divider means whereby said multivibrator produces a vertical blanking pulses;

a second bistable multivibrator having first and second outputs;

means coupling said second bistable multivibrator to said synchronizing equalizing gate pulse producing means and said frequency divider means whereby said multivibrator produces vertical drive pulses at said first output;

means coupled to said source of pulses for producing output pulses of a third frequency, said third frequency being one half of said first frequency;

means coupled to said vertical blanking pulse producing means and third frequency pulse producing means for producing a mixed blanking signal;

pulse modifying means coupled to said third frequency pulse producing means for producing horizontal drive pulses;

a first coincidence circuit having inputs coupled to said source of pulses and said third frequency pulse producing means for producing an output pulse upon the coincidence of pulses received therefrom;

attenuator means coupled to said first coincidence circuit for attenuating the pulse produced thereby;

a second coincidence circuit having inputs coupled to said source of pulses and to said second output of said second bistable multivibrator for producing an output pulse upon the coincidence of pulses received therefrom;

means for producing output pulses in response to input including a differentiating circuit having a capacitor;

means coupling said attenuator means and said second gate means to said differentiating circuit whereby pulses from said attenuator means charge said capacitor to a first value and cause said output pulse producing means to produce horizontal synchronizing signals of a first duration, and pulses from said second coincidence circuit charge said capacitor to a second value and cause said output pulse producing means to produce vertical synchronizing pulses of a second duration;

means coupled to said differentiating circuit and operable in response to said synchronizing equalizing gate pulse to change the time constant thereof; and means coupling said synchronizing equalizing gate pulse producing means to said time constant changing means whereby said output pulse producing means produces equalizing pulses of a third duration upon the occurrence of said synchronizing equalizing gate pulse.

9. A television synchronizing generator comprising:

a source of pulses of a first frequency;

first pulse producing means coupled to said source of pulses and responsive thereto to produce pulses at a second frequency, said second frequency being one third of said first frequency;

frequency divider means having eight stages coupled to said first pulse producing means for producing pulses at submultiples of said second frequency;

means coupled to the second, fourth, sixth and eighth stages of said frequency divider means and responsive to the outputs thereof for producing a synchronizing equalizing gate pulse;

a first bistable multivibrator having first and second inputs and an output, said first input being coupled to said synchronizing equalizing gate pulse producing means and said second input being coupled to said sixth stage of said frequency divider means, said bistable multivibrator producing a vertical blanking pulse initiated by said synchronizing equalizing gate pulse and terminated by a pulse from said sixth stage;

a second bistable multivibrator having first and second inputs and first and second outputs, said first input being coupled to said synchronizing equalizing gate pulse producing means and said second input being coupled to said third stage of said frequency divider means, said bistable multivibrator producing at said first output a vertical drive pulse initiated by said synchronizing equalizing gate pulse and terminated by a pulse from said sixth stage;

means coupled to said source of pulses for producing output pulses of a third frequency, said third frequency being one half of said first frequency;

means coupled to said output of said first bistable multivibrator and said third frequency pulse producing means for producing a mixed blanking signal;

pulse modifying means coupled to said third frequency pulse producing means for producing horizontal drive pulses;

a first coincidence circuit having inputs coupled to said source of pulses and said third frequency pulse producing means for producing an output pulse upon the coincidence of pulses received therefrom;

attenuator means coupled to said first coincidence circuit for attenuating the pulses produced thereby;

a second coincidence circuit having inputs coupled to said source of pulses and to said second output of said second bistable multivibrator for producing an output pulse upon the coincidence of pulses received therefrom;

means for producing output pulses in response to input pulses including a differentiating circuit having a capacitor;

means coupling said attenuator means and said second gate means to said differentiating circuit whereby pulses from said attenuator means charge said capacitor to a first value and cause said output pulse producing means to produce horizontal synchronizing pulses of a first duration, and pulses from said second coincidence circuit charge said capacitor to a second value and cause said output pulse producing means to produce vertical synchronizing pulses of a second duration;

means coupled to said differentiating circuit and operable in response to said synchronizing equalizing gate pulse to change the time constant thereof; and means coupling said synchronizing equalizing gate pulse producing means to said time constant changing means whereby said output pulse producing means produces equalizing pulses of a third duration upon the occurrence of said synchronizing equalizing gate pulse.

10. The synchronizing generator of claim 9 wherein said third frequency pulse producing means, an input of said first coincidence circuit and an input of said second coincidence circuit are coupled to said source of pulses of a first frequency by pulse delay means.

11. The synchronizing generator of claim 10 wherein said pulse delay means includes a differentiating circuit having a capacitor and an adjustable resistor.

12. In a television synchronizing generator, a system for generating a mixed blanking signal, comprising:
a source of pulse of a first frequency;
means coupled to said source of pulses for producing output pulses of a second frequency, said second frequency being one third of said first frequency;
frequency divider means coupled to said pulse producing means for producing pulses at submultiples of said second frequency;
means coupled to said frequency divider means for producing a synchronizing equalizing gate pulse;
a bistable multivibrator;
means coupling said bistable multivibrator to said synchronizing equalizing gate pulse producing means and said frequency divider means whereby said multivibrator produces vertical blanking pulses;
means coupled to said source of pulses for producing output pulses of a third frequency, said third frequency being one half of said first frequency; and
a coincidence circuit having inputs coupled to said bistable multivibrator and said third frequency pulse producing means for producing an output pulse upon the coincidence of pulses received therefrom.

13. In a television synchronizing generator, a system for generating a mixed blanking signal, comprising:
a source of pulse of a first frequency;
first pulse producing means coupled to said source of pulses and responsive thereto to produce pulses at a second frequency, said second frequency being one third of said first frequency;
frequency divider means having eight stages coupled to said first pulse producing means for producing pulses at submultiples of said second frequency;
means coupled to the second, fourth, sixth and eighth stages of said frequency divider means and responsive to outputs thereof for producing a synchronizing equalizing gate pulse;
a bistable multivibrator having first and second inputs and an output, said first input being coupled to said synchronizing equalizing gate pulse producing means and said second input being coupled to said sixth stage of said frequency divider means, said bistable multivibrator producing a vertical blanking pulse initiated by said synchronizing equalizing gate pulse and terminated by a pulse from said sixth stage;
means coupled to said source of pulses for producing output pulses of a third frequency, said third frequency being one half of said first frequency;
means for adjusting said third frequency pulses to the duration required for horizontal blanking pulses; and
a coincidence circuit having inputs coupled to said bistable multivibrator and said third frequency pulse producing means for producing an output pulse upon the coincidence of pulses received therefrom.

14. In a television synchronizing generator, a system for generating a mixed blanking signal, comprising:
a source of pulses of a first frequency;
first pulse producing means coupled to said source of pulses and responsive thereto to produce pulses at a second frequency, said second frequency being one third of said first frequency;
frequency divider means having eight stages coupled to said first pulse producing means for producing pulses at submultiples of said second frequency, each of said stages having a one output and a zero output;
coincidence circuit means coupled to the zero outputs of the fourth, sixth and eighth stages of said frequency divider means and to the one output of the second stage thereof, said circuit means being responsive to pulses from said outputs for producing a synchronizing equalizing gate pulse;
a bistable multivibrator having first and second inputs and an output, said first input being coupled to said coincidence circuit means and said second input being coupled to the zero output of said sixth stage, said bistable multivibrator being triggered on to initiate a vertical blanking pulse at said output upon the occurrence of said synchronizing equalizing gate pulse, said vertical blanking pulse being terminated by the occurrence of a pulse at said zero output of said sixth stage;
multivibrator means coupled to said source of pulses for producing an output pulse in response to every other pulse from said source, said multivibrator including means for adjusting the output pulses thereof to a desired duration; and
an AND gate having inputs coupled to said output of said bistable multivibrator and to said multivibrator means for producing an output pulse upon the coincidence of pulses received therefrom.

15. In a television synchronizing generator, a system for generating vertical blanking and vertical drive signals, comprising:
a source of pulses of a first frequency;
first pulse producing means coupled to said source of pulses and responsive thereto to produce pulses at a second frequency, said second frequency being one third of said first frequency;
frequency divider means having eight stages coupled to said first pulse producing means for producing pulses at submultiples of said second frequency, each of said stages having a one output and a zero output;
coincidence circuit means coupled to the zero outputs of the fourth, sixth and eighth stages of said frequency divider means and to the one output of the second stage thereof, said circuit means being responsive to pulses from said outputs for producing a synchronizing equalizing gate pulse;
a first bistable multivibrator having first and second inputs and an output, said first input being coupled to said coincidence circuit means and said second input being coupled to the zero output of said sixth stage, said bistable multivibrator being triggered on to initiate a vertical blanking pulse at said output upon the occurrence of said synchronizing equalizing gate pulse, said vertical blanking pulse being terminated by the occurrence of a pulse at said zero output of said sixth stage; and
a second bistable multivibrator having first and second inputs and an output, said first input being coupled to said coincidence circuit means and said second input being coupled to the one output of the third stage of said frequency divider means, said bistable multivibrator being triggered on to initiate a vertical drive pulse at said output upon the occurrence of said synchronizing equalizing gate pulse, said vertical drive pulse being terminated by the occurrence of a pulse at said one output of said third stage.

16. A system for providing a television synchronizing signal including horizontal and vertical pulses of different durations, comprising:
a source of pulses of a first frequency;
first means including a differentiating circuit coupled to said source for producing output pulses in response to pulses received therefrom, said means including means for adjusting the duration of said output pulses to a predetermined value;
first gate means coupled to said first pulse producing means for passing every other pulse produced thereby;
means coupled to said first gate means for attenuating the pulses passed thereby;

second gate means coupled to said first pulse producing means and periodically operable to pass all of the pulses produced thereby;

second means including a differentiating circuit for producing output pulses in response to input pulses; and means coupling said attenuating means and said second gate means to said differentiating circuit of said second pulse producing means whereby pulses passed by said first gate means cause the production of output pulses of a first duration and pulses passed by said second gate means cause the production of output pulses of a second duration.

17. A system for providing a composite synchronizing signal including horizontal, vertical and equalizing pulses of different durations, comprising:

a source of pulses of a first frequency;

first means including a differentiating circuit coupled to said source for producing output pulses in response to the trailing edge of pulses received therefrom, said means including means for adjusting the duration of said output pulses to a predetermined value;

first gate means coupled to said first pulse producing means for passing every other pulse produced thereby;

means coupled to said first gate means for attenuating the pulses passed thereby;

second gate means coupled to said first pulse producing means and periodically operable to pass all of the pulses produced thereby;

second means including a differentiating circuit for producing output pulses in response to the trailing edge of input pulses;

means coupling said attenuating means and said second gate means to said differentiating circuit of said second pulse producing means whereby pulses passed by said first gate means cause the production of output pulses of a first duration and pulses passed by said second gate means cause the production of output pulses of a second duration; and means for changing the time constant of said differentiating circuit of said second pulse producing means whereby output pulses of a third duration are produced.

18. A system for providing a composite television synchronizing signal including horizontal and vertical pulses of different durations, comprising:

a source of pulses of a first frequency;

first gate means coupled to said pulse source for passing every other pulse;

means coupled to said first gate means for attenuating the pulses passed thereby;

second gate means coupled to said pulse source and periodically operable to pass all of said pulses;

a differentiating circuit including a resistor and a capacitor connected together;

a transistor;

means biasing said transistor into conduction, the base of said transistor being coupled to the junction of said resistor and said capacitor;

mean coupling said attenuating means and said second gate means to said capacitor whereby said attenuated pulses charge said capacitor to a first value and cause said transistor to cease conduction and produce output pulses of a first duration, and pulses passed by said second gate means charge said capacitor to a second value and cause said transistor to cease conduction and produce output pulses of a second duration.

19. A system for providing a composite television synchronizing signal including horizontal, vertical and equalizing pulses of different durations, comprising:

a source of pulses of a first frequency;

first gate means coupled to said pulse source for passing every other pulse;

means coupled to said first gate means for attenuating the pulses passed thereby;

second gate means coupled to said pulse source and periodically operable to pass all of said pulses;

a differentiating circuit including a resistor and a capacitor connected together;

a transistor;

means biasing said transistor into conduction, the base of said transistor being coupled to the junction of said resistor and said capacitor;

means coupling said attenuating means and said second gate means to said capacitor whereby said attenuated pulses charge said capacitor to a first value and cause said transistor to cease conduction and produce output pulses of a first duration, and pulses passed by said second gate means charge said capacitor to a second value and cause said transistor to cease conduction and produce output pulses of a second duration;

a second transistor and a second resistor connected in series across said resistor, said transistor being normally non-conducting; and means for rendering said second transistor conducting whereby the time constant of said differentiating circuit is changed and said first transistor is caused to cease conducting and produce output pulses of a third duration.

20. A system for providing a composite television synchronizing signal including horizontal, vertical and equalizing pulses of different durations, comprising:

a source of pulses of a first frequency;

a first differentiating circuit including a capacitor and an adjustable resistor connected together;

a first transistor;

means biasing said first transistor into conduction, the base of said first transistor being coupled to the junction of said resistor and said capacitor;

means coupling said capacitor with said source of pulses whereby said first transistor ceases conduction and produces an output pulse in response to the trailing edge of an input pulse, said adjustable resistor being adjustable to determine the duration of said output pulse;

first gate means coupled to said first transistor for passing every other pulse produced thereby;

means coupled to said first gate means for attenuating the pulses passed thereby;

second gate means coupled to said first transistor and periodically operable to pass all the pulses produced thereby;

a second differentiating circuit including a resistor and a capacitor connected together;

a second transistor;

means biasing said transistor into conduction, the base of said second transistor being coupled to the junction of said resistor and said capacitor;

means coupling said attenuating means and said second gate means to said capacitor whereby said second transistor ceases conduction and produces an output pulse of a first duration in response to the trailing edge of a pulse from said attenuating means, and ceases conduction and produces an output pulse of a second duration in response to the trailing edge of a pulse from said second gate means;

a third transistor and a resistor connected in series across the resistor of said second differentiating circuit, said third transistor being normally non-conducting; and means for periodically rendering said second transistor conducting during the passage of pulses by said second gate means whereby the time constant of said differentiating circuit is changed and said second transistor is caused to cease conducting and produce output pulses of a third duration in response to the trailing edge of pulses from said second gate means.

21. A television synchronizing generator, comprising:

a source of pulses of a first frequency;

means coupled to said source of pulses for producing output pulses of a second frequency, said second frequency being one third of said first frequency;

frequency divider means coupled to said pulse producing means for producing pulses at submultiples of said second frequency;

means coupled to said frequency divider means for producing a synchronizing gate pulse;

a first bistable multivibrator;

means coupling said first bistable multivibrator to said synchronizing equalizing gate pulse producing means and said frequency divider means whereby said multivibrator produces vertical blanking pulses;

a second bistable multivibrator having first and second outputs;

means coupling said second bistable multivibrator to said synchronizing equalizing gate pulse producing means and said frequency divider means whereby said multivibrator produces vertical drive pulses at said first output;

means coupled to said source of pulses for producing output pulses of a third frequency, said third frequency being one half of said first frequency;

means coupled to said first bistable multivibrator and to third frequency pulse producing means for producing a mixed blanking signal;

first means including a differentiating circuit coupled to said source for producing output pulses in response to pulses received therefrom, said means including means for adjusting the duration of said output pulses to a predetermined value;

a first coincidence circuit having inputs coupled to said first pulse producing means and said third frequency pulse producing means for producing an output pulse upon the coincidence of pulses received therefrom;

attenuating means coupled to said first coincidence circuit for attenuating the pulses produced thereby;

a second coincidence circuit having inputs coupled to said first pulse producing means and to said second output of said second bistable multivibrator for producing an output pulse upon the coincidence of pulses received therefrom;

second means including a differentiating circuit for producing output pulses in response to input pulses;

means coupling said attenuating means and said second gate means to said differentiating circuit of said second pulse producing means whereby pulses produced by said first coincidence circuit cause the production of output pulses of a first duration and pulses produced by said second coincidence circuit cause the production of output pulses of a second duration;

means coupled to said differentiating circuit of said second pulse producing means and operable in response to said synchronizing equalizing gate pulse to change the time constant thereof; and means coupling said synchronizing equalizing gate pulse producing means to said time constant changing means whereby said output pulse producing means produces equalizing pulses of a third duration upon the occurrence of said synchronizing equalizing gate pulse.

22. The synchronizing generator of claim 21 wherein said third frequency pulse producing means and said first pulse producing means are coupled to said source of pulses by third means including a differentiating circuit for producing output pulses in response to input pulses.

23. A television synchronizing generator comprising:

a source of pulses of a first frequency;

first pulse producing means coupled to said source of pulses and responsive thereto to produce pulses at a second frequency, said second frequency being one third of said first frequency;

frequency divider means having eight stages coupled to said first pulse producing means for producing pulses at submultiples of said second frequency, each of said stages having a one output and a zero output;

coincidence circuit means coupled to the zero outputs of the fourth, sixth and eighth stages of said frequency divider means and to the one output of the second stage thereof, said circuit means being responsive to pulses from said outputs for producing a synchronizing equalizing gate pulse;

a first bistable multivibrator having first and second inputs and an output, said first input being coupled to said coincidence circuit means and said second input being coupled to the zero output of said sixth stage, said bistable multivibrator being triggered on to initiate a vertical blanking pulse at said output upon the occurrence of said synchronizing equalizing gate pulse, said vertical blanking pulse being terminated by the occurrence of a pulse at said zero output of said sixth stage;

a second bistable multivibrator having first and second inputs, a one output and a zero output, said first input being coupled to said coincidence circuit means and said second input being coupled to the one output of the third stage of said frequency divider means, said bistable multivibrator being triggered on to initiate a vertical drive pulse at said zero output upon the occurrence of said synchronizing equalizing gate pulse, said vertical drive pulse being terminated by the occurrence of a pulse at said one output of said third stage;

means coupled to said source of pulses for producing output pulses of a third frequency, said third frequency being one half of said first frequency;

means coupled to said output of said first bistable multivibrator and said third frequency pulse producing means for producing a mixed blanking signal;

pulse modifying means coupled to said third frequency pulse producing means for producing horizontal drive pulses;

a first coincidence circuit having inputs coupled to said source of pulses and said third frequency pulse producing means for producing an output pulse upon the coincidence of pulses received therefrom;

attenuator means coupled to said first coincidence circuit for attenuating the pulses produced thereby;

a second coincidence circuit having inputs coupled to said source of pulses and to said one output of said second bistable multivibrator for producing an output pulse upon the coincidence of pulses received therefrom;

means for producing output pulses in response to input pulses including a differentiating circuit having a capacitor;

means coupling said attenuator means and said second coincidence circuit to said differentiating circuit whereby pulses from said attenuator means charge said capacitor to a first value and cause said output pulse producing means to produce horizontal synchronizing pulses of a first duration, and pulses from said second coincidence circuit charge said capacitor to a second value and cause said output pulse producing means to produce vertical synchronizing pulses of a second duration;

means coupled to said differentiating circuit and operable in response to said synchronizing equalizing gate pulse to change the time constant thereof; and means coupling said synchronizing equalizing gate pulse producing coincidence circuit means to said time constant changing means whereby said output pulse producing means produces equalizing pulses of a third duration upon the occurrence of said synchronizing equalizing gate pulse.

24. The synchronizing generator of claim 23 wherein an input of said first coincidence circuit and an input of said second coincidence circuit are coupled to said source of pulses by means including a differentiating circuit coupled to said source for producing output pulses in response to pulses received therefrom, said means including means for adjusting the duration of said output pulses to a predetermined value.

25. The synchronizing generator of claim 24 wherein said third frequency pulse producing means and said adjustable output pulse producing means are coupled to said source of pulses by means including a differentiating circuit having a capacitor and a variable resistor.

26. A television synchronizing generator comprising:

a source of pulses of a first frequency;

first pulse producing means coupled to said source of pulses and responsive thereto to produce pulses at a second frequency, said second frequency being one third of said first frequency;

frequency divider means having eight stages coupled to said first pulse producing means for producing pulses at submultiples of said second frequency, each of said stages having a one output and a zero output;

coincidence circuit means coupled to the zero outputs of the fourth, sixth and eighth stages of said frequency divider means and to the one output of the second stage thereof, said circuit means being responsive to pulses from said outputs for producing a synchronizing equalizing gate pulse;

a first bistable multivibrator having first and second inputs and an output, said first input being coupled to said coincidence circuit means and said second input being coupled to the zero output of said sixth stage, said bistable multivibrator being triggered on to initiate a vertical blanking pulse at said output upon the occurrence of said synchronizing equalizing gate pulse, said vertical blanking pulse being terminated by the occurrence of a pulse at said zero output of said sixth stage;

a second bistable multivibrator having first and second inputs, a one output and a zero output, said first input being coupled to said coincidence circuit means and said second input being coupled to the one output of the third stage of said frequency divider means, said bistable multivibrator being triggered on to initiate a vertical drive pulse at said zero output upon the occurrence of said synchronizing equalizing gate pulse, said vertical drive pulse being terminated by the occurrence of a pulse at said one output of said third stage;

means coupled to said source of pulses for producing output pulses of a third frequency, said third frequency being one half of said first frequency;

means coupled to said output of said first bistable multivibrator and said third frequency pulse producing means for producing a mixed blanking signal;

pulse modifying means coupled to said third frequency pulse producing means for producing horizontal drive pulses;

a first differentiating circuit including a capacitor and an adjustable resistor connected together;

a first transistor;

means biasing said first transistor into conduction, the base of said first transistor being coupled to the junction of said resistor and said capacitor;

means coupling said capacitor with said source of pulses whereby said first transistor ceases conduction and produces an output pulse in response to the trailing edge of an input pulse, said adjustable resistor being adjustable to determine the duration of said output pulse;

first gate means having inputs coupled to said first transistor and to said third frequency pulse producing means for producing an output pulse upon the coincidence of pulses received therefrom;

means coupled to said first gate means for attenuating the pulses produced thereby;

second gate means coupled to said first transistor and to said one output of said second bistable multivibrator for producing an output pulse upon the coincidence of pulses received therefrom;

a second differentiating circuit including a resistor and a capacitor connected together;

a second transistor;

means biasing said transistor into conduction, the base of said second transistor being coupled to the junction of said resistor and said capacitor;

means coupling said attenuating means and said second gate means to said capacitor whereby said second transistor ceases conduction and produces an output pulse of a first duration in response to the trailing edge of a pulse from said attenuation means, and ceased conduction and produces an output pulse of a second duration in response to the trailing edge of a pulse from said second gate means;

a third transistor and a resistor connected in series across the resistor of said second differentiating circuit, said third transistor being normally non-conducting;

means coupling said third transistor to said synchronizing equalizing gate pulse producing coincidence circuit means, portions of said synchronizing equalizing gate pulse rendering said third transistor conducting whereby the time constant of said second differentiating circuit is changed and said second transistor is caused to cease conducting and produce output pulses of a third duration during said portions of said synchronizing equalizing gate pulse in response to the trailing edge of pulses from said second gate means.

27. The synchronizing generator of claim 26 wherein said third frequency pulse producing means and said first differentiating circuit are coupled to said source of pulses by means including a differentiating circuit having a capacitor and a variable resistor.

28. The synchronizing generator of claim 26 wherein said pulse modifying means includes means including a differentiating circuit having a capacitor and an adjustable resistor.

References Cited

UNITED STATES PATENTS

| | | | |
|---|---|---|---|
| 3,281,532 | 10/1966 | Leeds | 178—69.5 |

JOHN W. CALDWELL, *Primary Examiner.*

R. L. RICHARDSON, *Assistant Examiner.*